United States Patent [19]

Riberio Pinto

[11] Patent Number: 5,069,024
[45] Date of Patent: Dec. 3, 1991

[54] CLEANING DEVICE FOR HARVESTED SUGAR CANE OR SIMILAR PRODUCTS

[75] Inventor: Luiz Antonio C. D. Riberio Pinto, Ribeirao Preto, Brazil

[73] Assignee: Santal Equipamentos S/A Comercio E. Industria, Ribeirao Preto, Brazil

[21] Appl. No.: 609,590

[22] Filed: Nov. 6, 1990

[30] Foreign Application Priority Data

Nov. 7, 1989 [BR] Brazil ................... 18905889

[51] Int. Cl.⁵ ............... A01D 35/00; A01D 53/00
[52] U.S. Cl. ................................................ 56/12.8
[58] Field of Search ............... 56/12.8, 12.9, 13.1, 56/14.3, 14.5, 15.8

[56] References Cited

U.S. PATENT DOCUMENTS

| | | | |
|---|---|---|---|
| 3,599,404 | 8/1971 | Fernandez | 56/12.8 |
| 3,608,597 | 9/1971 | Hill | 56/12.8 X |
| 3,788,048 | 1/1974 | Stiff et al. | 56/12.8 X |

*Primary Examiner*—Thuy M. Bui
*Attorney, Agent, or Firm*—Darby & Darby

[57] ABSTRACT

Cleaning device for harvested sugar cane or similar products having a guiding duct (10) which receives, from a throwing assembly (L), cane billets and trash, sending them to a deflecting duct (20) which receives the material through a first inlet (21) communicating with an upper outlet of the guiding duct (10) and placed on a laterally broadened portion of the duct, having a diverging polygonal structure (12) that spreads the material being sent to the deflecting duct (20). The deflecting duct (20) has a body portion (23) provided with curves that spread the billets and trash now-incorporated in a flowing mixture containing air, which was introduced in the deflecting duct (20) through air inlets placed on the upper portion (22) and lower portion (25) of its inlet (21) and through auxiliary lateral air inlets (26) provided on each side of the body portion (23). The deflecting duct (20) further has an outlet (24) communicating with an inlet (31) of a pneumatic separating chamber (30) in which, through an upper outlet (32) having extracting fans (33), the air-trash mixture is aspirated and launched away from the cleaning device. The cane billets, free from trash, are sent to a reservoir R of a transport vehicle, through an outlet (43) which is internally provided with a plurality of disaggregating fins (36) which "open" the agglomerations of billets and trash, the trash being aspirated towards the upper outlet (32).

12 Claims, 3 Drawing Sheets

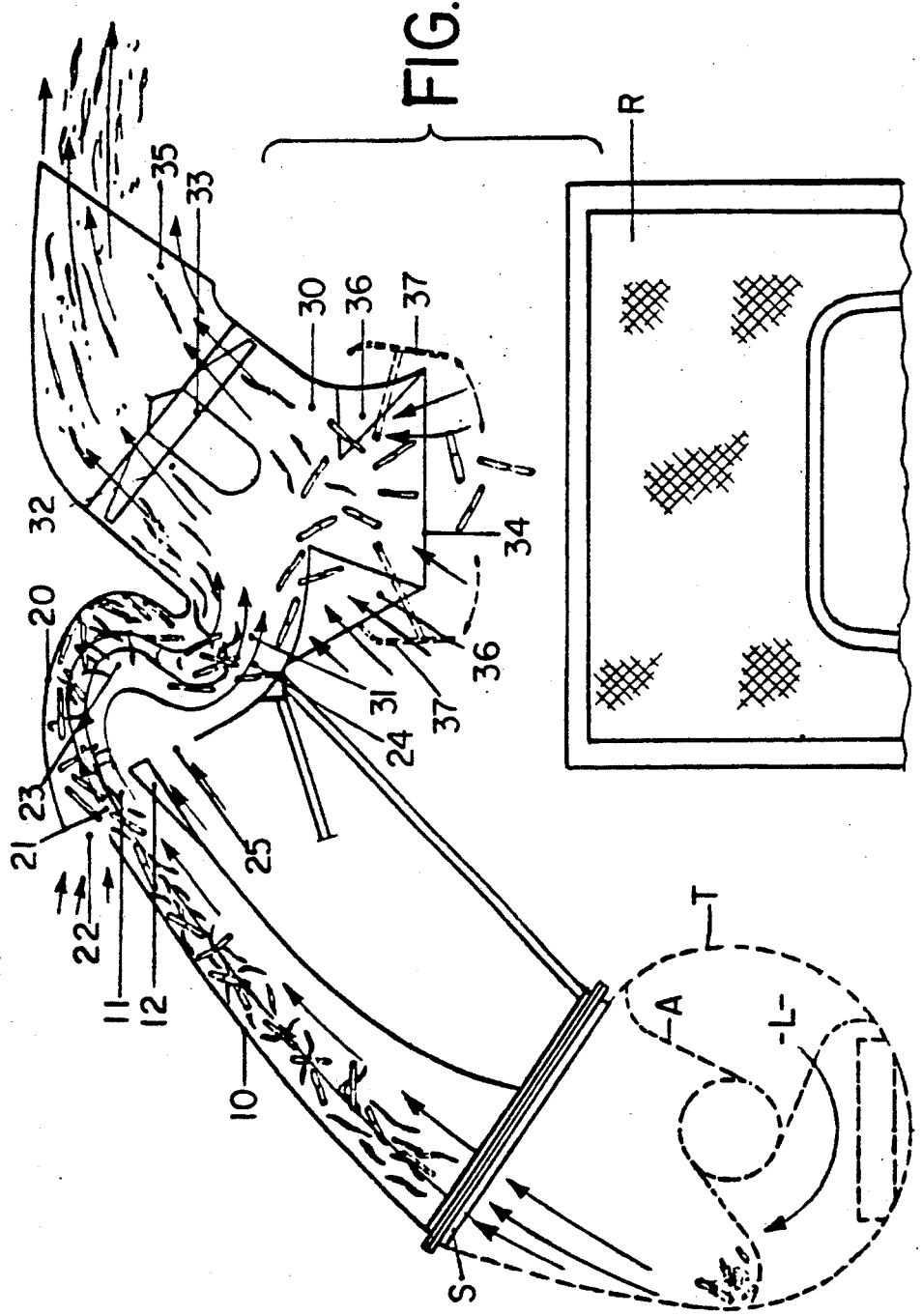

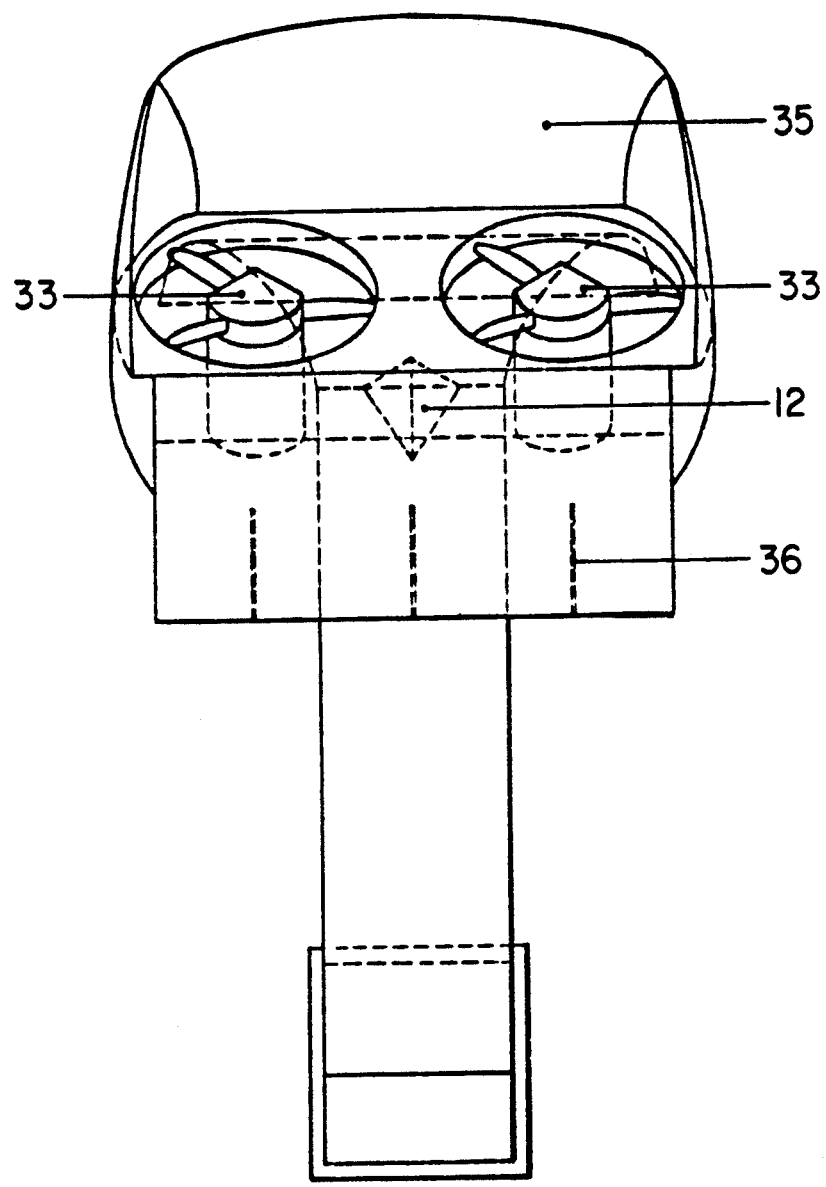

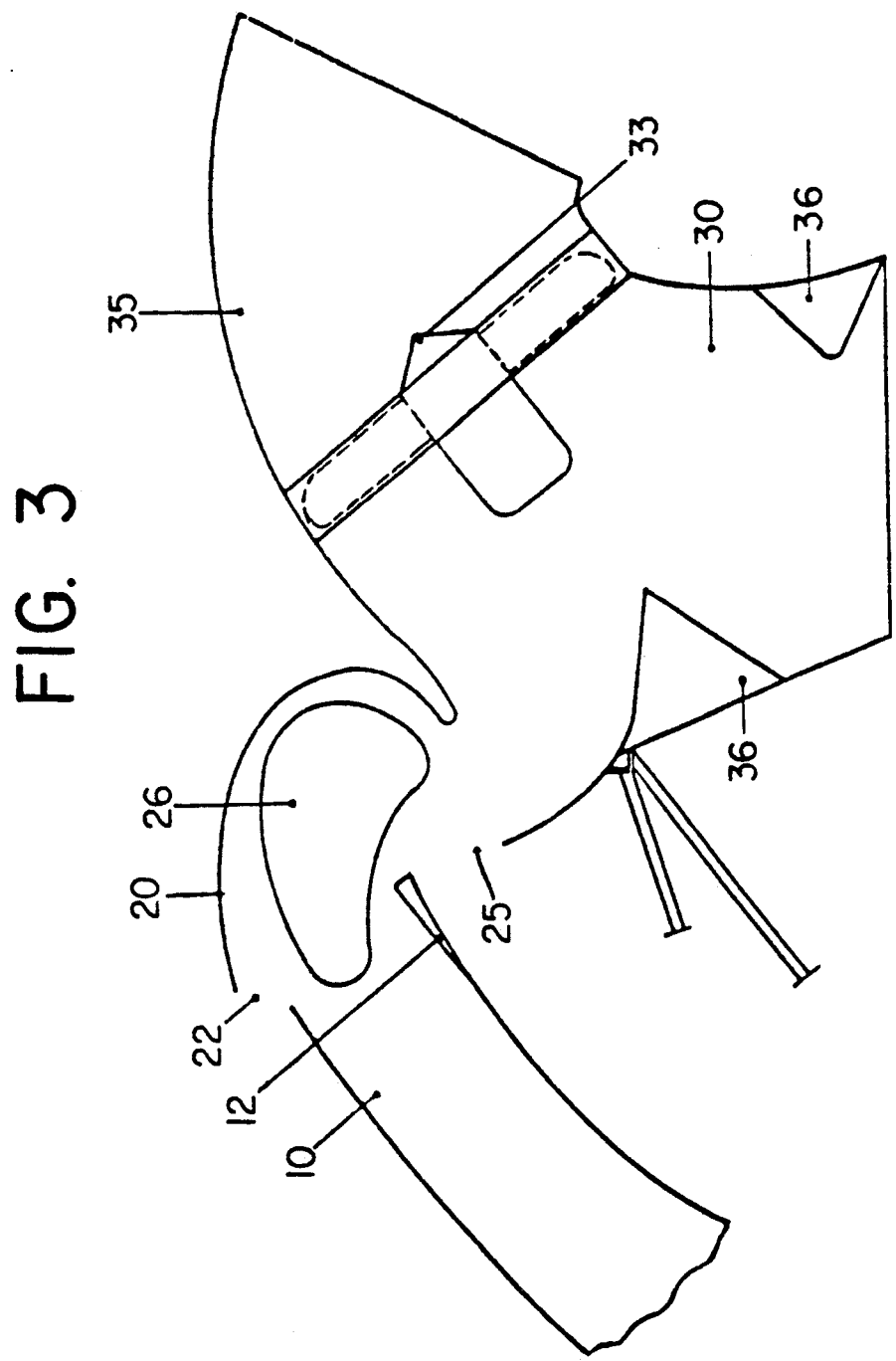

CLEANING DEVICE FOR HARVESTED SUGAR CANE OR SIMILAR PRODUCTS

BACKGROUND OF THE INVENTION

The present invention relates to a cleaning device to be used in machines for harvesting sugar cane or similar products, or in independent cleaning systems for sugar cane billets, which previously were manually or mechanically harvested. More specifically, the invention relates to harvesting machines of the cutting, chopping, cleaning and loading type which are used in the harvesting of sugar cane "in natura" and burned conditions.

One of the major problems still found nowadays in the sugar cane mechanized harvesting, specially in the chopping-loading harvesters, is the final product quality in relation to the amount of trash contained in the product. The word "trash", as herein used, means soil, sand, vegetal impurities, mainly leaves, tips and roots of sugar cane.

The known harvesters of the chopping throwing-loading type have cleaning systems provided with fans which produce air flows in a transverse or opposite direction in relation to the billet path. During the throwing-loading path of the cane billets with associated trash to the transport vehicle, the cane billets suffer the action of the air flow from the fans causing a separation between the cane billets and the trash. During this separation the cane billets, which are heavier than the trash, proceed in their path towards said vehicle, and the trash, which is lighter, is drawn by the air flow through a side or vertical outlet provided in a load guiding duct of the harvester.

When employed in the harvesting of burned sugar cane, such system presents satisfactory trash rates, reaching values ranging from 3% to 6%, by weight of transported load. However, in non-burned cane harvesting, such values increase substantially, ranging between 12% and 18% by weight, increasing the transportation costs and the fiber content in the milled material in the plant, with a consequent operational yield decrease.

SUMMARY OF THE INVENTION

Aiming to lower said impurity rates in the harvesting of non-burned sugar cane, the present invention refers to a cleaning device for harvesting sugar cane or similar products, which is designed to produce inversions in the path of the cane billets, forcing the same to traverse alternated curves under the action of powerful trash extracting fans. The combined action of said curves and extracting fans causes the separation between the cane billets and trash, increasing the cleaning rates to equivalent or even greater values in relation to those obtained with burned cane.

The curves are located in a portion of the harvester body as a deflecting duct, in order to increase the spacing between the cane billets and trash, which are lead thereto by guiding and raising means attached to said body portion and sent to a separation chamber. From here the billets are finally delivered, free from trash, to a transport vehicle which follows the harvesting machine. The guiding-raising means may be mechanical or pneumatic consisting of, for example, a guiding duct to conduct the cane billets and trash, with a lower end attached to a throwing means and leading the billets and trash, in an upwardly inclined path and through an upper end, to the deflecting duct. For a better spreading of the billets and trash, the deflecting duct has a progressive lateral broadening of its upper and lower faces, which broadening reaches its maximum value at an outlet end of the deflecting duct, which also has a diverging structure placed near the upper end of the guiding-raising means and in at least one of its inner faces.

The deflecting duct is connected to a pneumatic separating chamber, in which extracting fans aspirate the trash through an upper outlet, the billets being conveyed to a reservoir in the transport vehicle.

A plurality of trash disaggregating fins are internally provided in a lower outlet of the pneumatic chamber, "opening" the agglomerations of trash adhered to the cane billets and releasing the trash, which is aspirated through an upper outlet of the separating chamber and, together with the trash which previously has been separated from the billets, thrown away from the cleaning device.

BRIEF DESCRIPTION OF THE DRAWINGS

The invention will now be described with reference to the following specification and annexed drawings, in which:

FIG. 1 shows a side sectional view of the cleaning device;

FIG. 2 is a front view of said device, showing the location of the extracting fans; and FIG. 3 shows, in detail, auxiliary lateral air inlet openings of the deflecting duct in the body of said cleaning device.

DETAILED DESCRIPTION OF THE INVENTION

According to FIG. 1, the cleaning device for harvesters of sugar cane or similar products is connected, only for illustrative purposes, to a cane billet throwing assembly L having a cylinder T. The cylinder has a longitudinal horizontal shaft carrying at least one radial throwing fin A and is provided with a first inlet for the entrance of cut billets containing trash and with at least one upper tangential outlet S.

An inclined guiding duct 10 is engaged to the cylinder 7 upper outlet S, to upwardly convey the cane billets and trash thrown therein by the throwing assembly L. This material is then sent to a reverse curved deflecting duct 20 through an outlet 11 at the upper end of the guiding duct 10. Any other embodiment which raises and throws the cane billets can be used.

During this displacement, the hitting of the billets and other materials against each other and against the walls of said guiding duct 10 decreases the materials ascending speed, which has already been naturally and gradually reduced with the height, due to the constant action of gravity on said material. Furthermore, the non-homogeneity of the mass and dimensions of each material component leads to a consequent agglomeration or collection of material in the upper end proximites of the guiding duct 10, jeopardizing the cleaning of the cane billets and contributing to increase the impurity percentage in the final product. The decrease of this collection rate is partially obtained by the provision of a diverging polygonal structure 12, in one of the upper end inner faces of the guiding duct 10, which causes a lateral spreading of billets and trash towards the deflecting duct 20. In the illustrative embodiment described, the structure 12 is placed at the lower inner face of the upper end of the guiding duct 10.

For a better distribution of the material, the guiding duct 10 is further provided, in a portion of its upper end, with a progressive lateral broadening of its upper and lower faces. This broadening begins at the edge of the outlet 11 reaching its maximum value at the end of said deflecting duct 20. Connected to said outlet 11, there is a first inlet end 21 of said deflecting duct 20, through which the billets and trash coming from the guiding duct 10 receive an air flow from a first air inlet 22, which is placed above said outlet 11 and defined between the upper edge of the outlet end 11 and the upper edge of the inlet end 21 of said deflecting duct 20. The deflecting duct 20 is further provided with at least one second air inlet 25, externally placed adjacent to the lower edge of said inlet end 21.

Auxiliary air inlets 26 (FIG. 3) are placed in at least one lateral face of the deflecting duct 20. The flowing mixture obtained from the addition of air to the billets and trash, after entering the deflecting duct 20, reaches a body portion 23 thereof, said body portion being formed by curves which change progressively and alternately. The direction of displacement of said flowing mixture guiding said mixture, downwardly, at an initial step, according to a direction forming an angle from about 135° to 180° relative to the direction of the material entering the deflecting duct 20.

Such curves of the deflecting duct are arranged in order that, at a final step, a curve adjacent to an outlet 24 of said deflecting duct 20 forms an angle from about 45° to 90° in relation to the adjacent preceding curve portion, in order to throw said flowing mixture, almost horizontally, to a pneumatic separating chamber 30 where, by the action of gravity, the cane billets are guided to a lower outlet 34 of said separating chamber. The trash is upwardly aspirated towards an upper outlet 32 of said chamber and then launched away from the cleaning device.

In this embodiment, the deflecting duct 20 presents approximately the form of an "S", having a first upper curve of negative concavity connected to a second lower curve of positive concavity, which outlet is positioned facing a direction forming an angle of about 90° in relation to the direction at the junction point of the first and second curves, communicating the deflecting duct with the separating chamber.

There is connected to the outlet 32 of the pneumatic separating chamber 30, at least one, preferably two, extracting fans 33, which are arranged to produce an upward air flow within said separating chamber sufficient to aspirate the trash, free from the cane billets, which enter said separating chamber 30 through an inlet 31 connected to the outlet 24 of the deflecting duct 20.

Both extracting fans are laterally disposed in relation to each other, in a position which is inclined in relation to the inlet 31 of the separating chamber 30. Above the extracting fans 33, a trash directional duct 35 guides the air and trash flow aspirated from within said separating chamber in a lateral direction and away from the cleaning device.

In the preferred embodiment described, a plurality of trash disaggregating fins 36 are arranged at the side faces adjacent to the lower outlet 34 of the separating chamber 30, in order to dismantle more compact agglomerations of trash and cane billets, the latter being conveyed to a reservoir R of a transport vehicle. These agglomerations, which are formed at the beginning of the throwing operation when the sugar cane is thrown into the guiding duct 10, hinder the withdrawal of leaves and straw intermixed with the cane billets.

When such aggregating fins dismantle said agglomerations, the trash is released and then aspirated by said extracting fans 33 placed in the upper portion of said separating chamber 30. The separating chamber 30 further has a moving cover 37, articulated by means of an arm which is fixed at least on one side wall of the body of said separating chamber. The cover closes the outlet 34, storing the cane billets within the separating chamber 30 during the substitution or maneuver of the transport vehicle that receives the billets, without interrupting the operation of the harvester.

In the preferred embodiment, two moving covers 37 are provided, which are driven by means of hydraulic cylinders operating at opposite directions in order to open or close said outlet 34 of the separating chamber 30. The passage of the flowing mixture consisting of air, cane billets and trash through at least one body portion of the means provided with curves, causes an increased separation between the elements of said flowing mixture improving the elimination of trash by the action of the extracting fans 33 and increasing the harvested product cleaning rate to equivalent or even greater values in relation to those obtained with burned sugar cane.

In another embodiment, the body of the deflection duct 20 provided with curves may be internally arranged with disaggregating fins or projections which are distributed at least in a portion of said body, in order to dismantle the billet and trash agglomerations before they are subjected to action of the extracting fans. In this embodiment, the "opening" of said agglomerations occurs when they hit said projections, improving the cleaning efficiency of the flow of billets reaching the reservoir R.

Both arrangements present a substantial improvement in the cleaning efficiency of non-burned sugar cane which was manually or mechanically harvested, decreasing the amount of fiber contained in the milled material in the plant, with a consequent increase in the operational yield of the whole process.

What is claimed is:

1. Cleaning device for harvested sugar cane or similar products, of the type comprising:
   cane billet guiding-raising means having a first lower inlet for the entrance of cut sugar cane billets containing trash and an upper outlet end for the exit of said material,
   a deflecting duct having a first billet inlet end communicating with the upper outlet end of the guiding-raising means, said deflecting duct being provided with at least one first air inlet, a body portion formed by curves to progressively and alternately change the direction of displacement of a flowing mixture of air, cane billets and trash and an outlet,
   a chamber for separating cane billets and trash having an inlet communicating with the outlet of the deflecting duct, an upper trash outlet and a lower billet outlet,
   said separating chamber being provided with at least one extracting fan arranged to produce an upward air flow through the interior of said separating chamber, from the inlet towards the upper trash outlet, sufficient to launch through said outlet the trash free from the billets which were present in said separating chamber.

2. A device as in claim 1 wherein said curved body portion of said deflecting chamber to guide said flowing mixture has an initial step, downwardly forming an angle from about 135° to 180° relative to the direction of the billets and trash entering said deflecting duct, and at a final step, in an opposite direction relative to the preceding one, defining at a second end of the deflecting duct, an outlet for said flowing mixture which is such placed as to form an angle of about 45° to 90° in relation to the preceding curve portion.

3. A device as in claim 2, wherein said first upper air inlet is defined between the upper edge of the outlet end of the guiding-raising means and the upper edge of the billet inlet end of the deflecting duct.

4. A device as in claim 1, wherein the deflecting duct has said first air inlet located above said billet and trash outlet of said guiding-raising means and a second air inlet defined below said outlet.

5. A device as in claim 1, wherein the deflecting duct has at least one auxiliary air inlet placed on either side thereof.

6. A device as in claim 1, wherein the second air inlet is placed below and adjacent the lower edge of said outlet end of said guiding-raising means.

7. A device as in claim 1, wherein said separating chamber has a trash directional duct connected to the upper outlet of said separating chamber and positioned above said extracting fans to guide the air and trash flow aspirated from within said chamber laterally and away from said cleaning device.

8. A device as in claim 1, wherein said deflecting duct has a progressive lateral broadening of its upper and lower faces, beginning at the billet inlet end of said deflecting duct.

9. A device as in claim 8, wherein said separating chamber is provided with at least one moving cover at the lower outlet thereof, said moving cover being articulated by an arm which is fixed at least on one side of the body of said chamber.

10. A device as in claim 1, wherein said separating chamber is provided with a plurality of trash disaggregating fins internally arranged in the lower billet outlet.

11. A device as in claim 1, wherein said deflecting duct has the general form of an "S".

12. A device as in claim 1, wherein the guiding-raising means comprises an inclined duct to upwardly guide the cane billets and trash, said guiding duct having a first lower inlet for the entrance of billets and trash, and an upper outlet end communicating said guiding duct with the inlet of the deflecting duct, said guiding duct further having, at least on one of its upper inner faces and on the inner lower face of the outlet end, a diverging polygonal structure, to laterally spread the billets and trash passing through said outlet end.

* * * * *